Aug. 2, 1932.  C. NAGLE ET AL  1,869,767
LEER STACKER
Filed Dec. 2, 1927   3 Sheets-Sheet 1
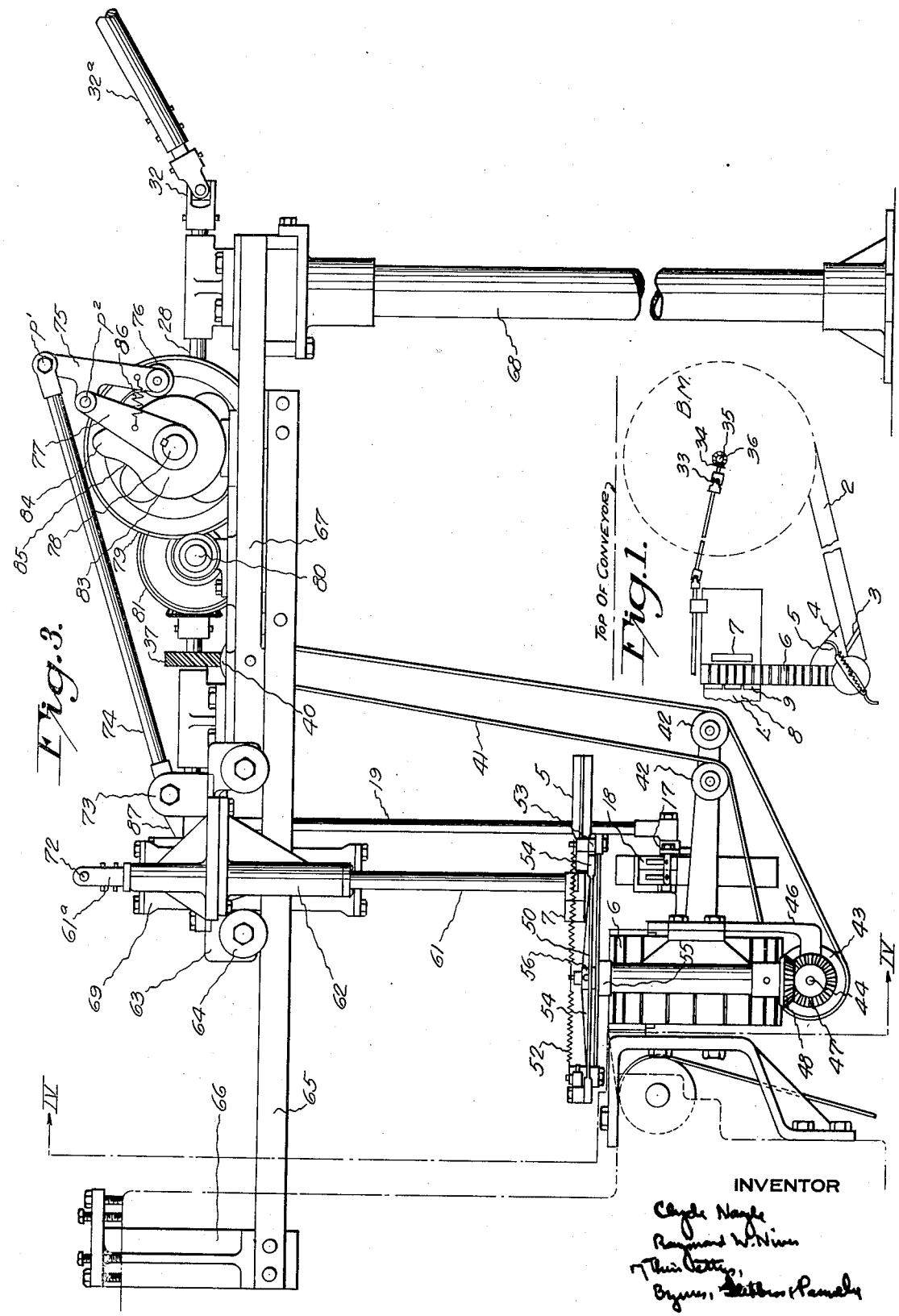
INVENTOR

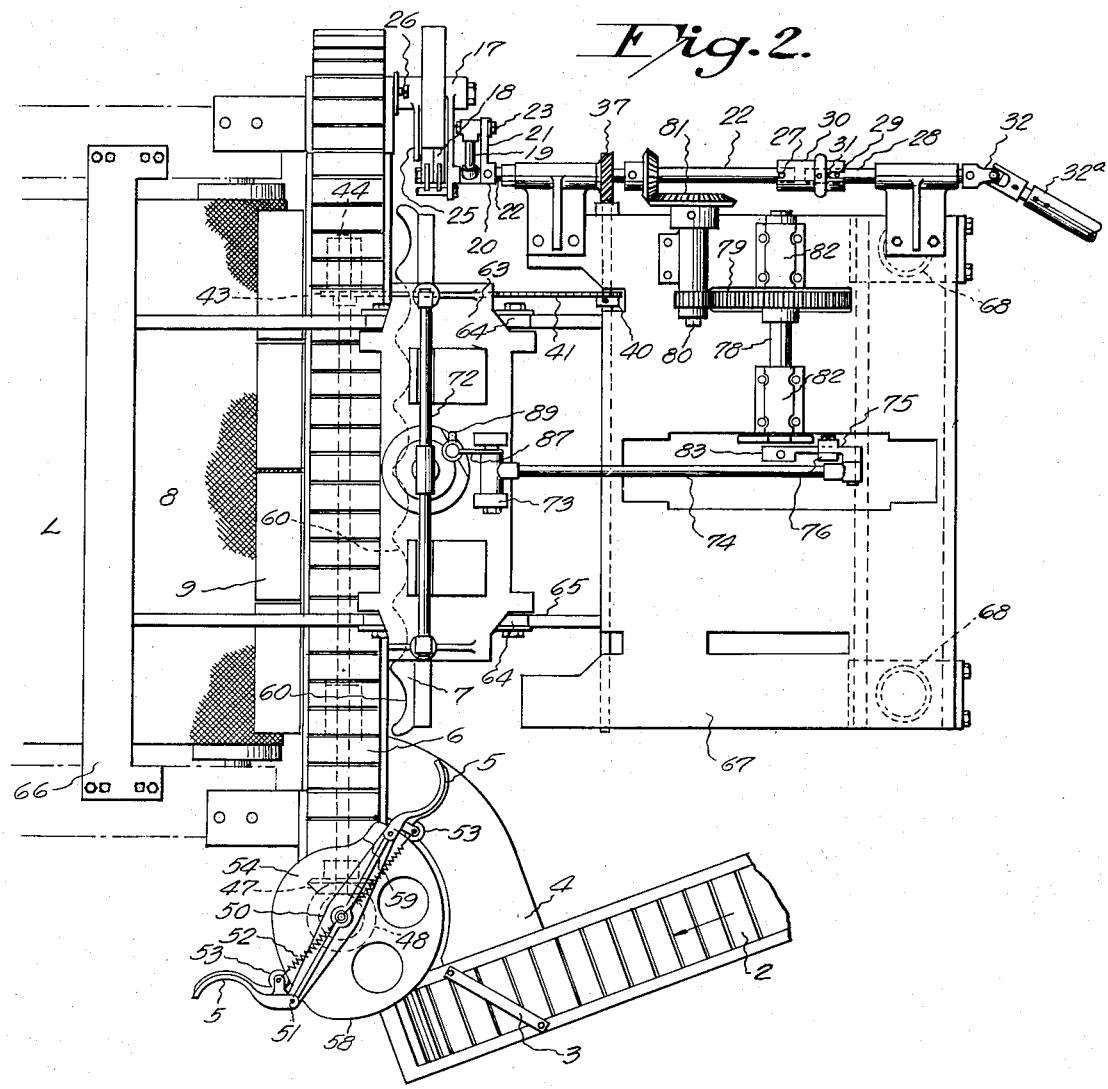
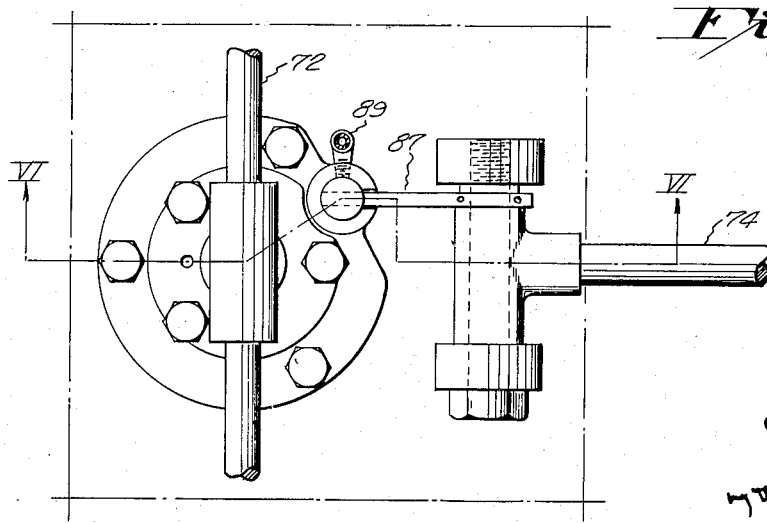

Aug. 2, 1932.  C. NAGLE ET AL  1,869,767
LEER STACKER
Filed Dec. 2, 1927  3 Sheets-Sheet 3
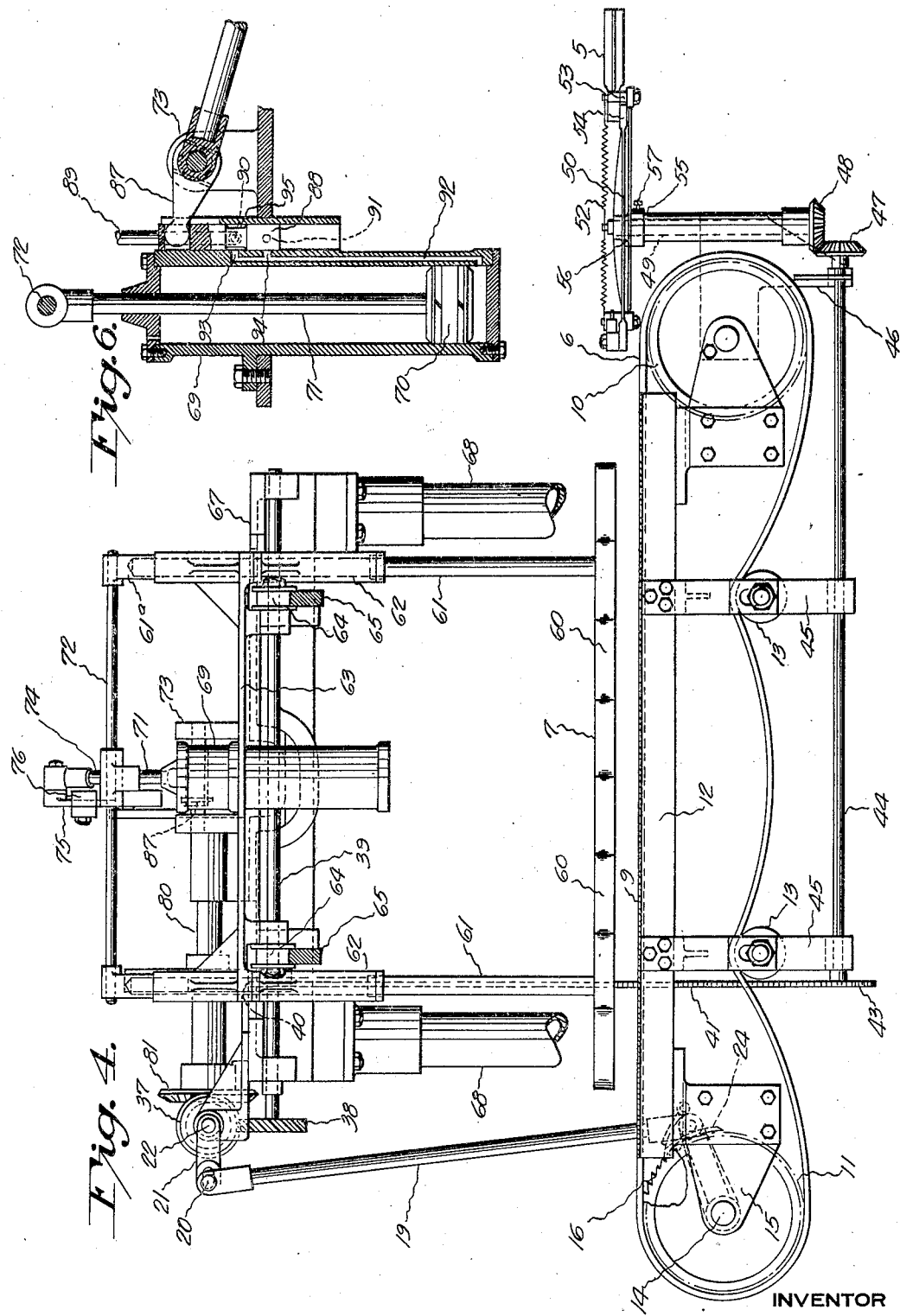
INVENTOR Patented Aug. 2, 1932

1,869,767

UNITED STATES PATENT OFFICE

CLYDE NAGLE AND RAYMOND W. NIVER, OF ELMIRA, NEW YORK

LEER STACKER

Application filed December 2, 1927. Serial No. 237,293.

This invention relates to leer stackers for the positioning of glassware in an annealing leer. It is herein described as applied to a leer employing a continuously moving belt for carrying the articles through the leer, although it may be used in connection with leers of other types.

In the patent to R. W. Niver, 1,427,164, dated August 29th, 1922, there is described a leer stacker embodying a conveyor for moving ware transversely of the leer, and a pusher operated at intervals to move the ware sidewise from the cross conveyor into the leer proper. We employ a somewhat similar arrangement but provide a number of features not found in the Niver leer stacker.

We so position the means for driving the pusher that it is spaced above the plane of the conveyor a distance at least equal to the maximum height of the ware being handled. This gives a very flexible construction as it permits of feeding ware from the pressing or blowing machine at almost any angle. In many glass factories it is necessary to place the pressing or blowing machines and their corresponding leers in widely varying relations. With our leer stacker a minimum of difficulty is encountered in providing conveying means for carrying the ware from the pressing or blowing machine to the stacker.

We preferably employ a cross conveyor, a belt which carries the ware to a point adjacent the receiving end of the cross conveyor, and a sweep for moving the ware onto the cross conveyor. This sweep preferably comprises a pivoted arm whose position is controlled by a cam. With this arrangement it is possible to accurately position each piece of ware on the cross conveyor. The cross conveyor is preferably arranged so as to be moved forward in a step by step manner, and the movement of the pusher is so timed relative to the step by step movement of the conveyor that the ware on the conveyor is taken into the leer without interfering with the feeding of succeeding articles along the cross conveyor. The pusher is arranged to space the articles apart and thus more accurately position them in the leer.

In the Niver patent above referred to, a stop is employed for controlling the passage of ware to a point in front of the pusher and the pusher is so mounted that it is swung sidewise and vertically by a cam so as to clear ware on the conveyor on the return stroke of the pusher. We provide means for raising the pusher in a substantially vertical direction, thus making useful the space which was wasted in the former machine, and permitting of stacking ware very close to each side wall of the leer.

We further provide means for moving the pusher at high velocity as it travels over the conveyor. Since the conveyor moves in a step by step manner, and since no stops are provided for checking the movement of ware therealong, it is necessary to move the pusher at high velocity so as to eliminate interference. We employ a crank for moving the pusher but instead of connecting this crank directly through a pitman we employ an intermediate link which is controlled by a fixed cam, thus imparting additional velocity to the pusher as it moves over the cross conveyor. This same cam is also useful in that it is shaped to materially decrease the velocity of the pusher as the ware is moved onto the leer belt. These leer belts are somewhat rough and if the ware were moved onto them at high velocity there would be danger of overturning some of the articles.

Provision is made for driving the stacker from the glass forming machine so as to properly time the operations. By reason of the provision of the sweep for transferring the ware to the cross conveyor, exact timing between the forming machine and the stacker is not essential, but it is desirable in that it keeps the ware properly spaced apart on the conveyor which supplies the stacker.

In the accompanying drawings which illustrate the present preferred embodiment of our invention, Figure 1 is a top plan view, more or less diagrammatic, showing a bottle making machine, a leer, and our improved leer stacker, Figure 2 is a top plan view of the stacker and a portion of the leer and the supply conveyor, Figure 3 is a side elevation of the stacker, Figure 4 is a vertical transverse section taken on the line IV—IV of Figure 3, Figure 5 is a top plan view to enlarged scale showing the means for controlling the vertical movement of the pusher, and Figure 6 is a vertical section taken on the line VI—VI of Figure 5.

Referring first to Figure 1 there is shown a bottle blowing machine, indicated diagrammatically at BM, effective for blowing bottles and delivering them to a conveyor 2. The conveyor 2 carries the bottles against a stop 3 which is inclined to the direction of travel of the bottles on the conveyor. When a bottle strikes the stop 3 it is urged sidewise onto a table 4 where it is engaged by one of a pair of sweeps 5 which deliver it to a cross conveyor 6. On small ware it may be desirable to employ three or four sweeps. The cross conveyor 6 is advanced in a step by step manner and when a number of bottles are located thereon, a pusher 7 is actuated to move the bottles sidewise into a leer L. The bottles are supported in the leer by a belt 8. Dead plates 9 are located adjacent the cross conveyor 6 so as to provide a support for the bottles as they are moved from the conveyor 6 onto the belt 8.

The construction of the stacker is shown in detail in Figures 2 to 6 inclusive. The cross conveyor 6 comprises a chain belt extending between sprockets 10 and 11. The upper flight of the conveyor is carried in guides 12 and the lower flight extends over vertically adjustable idlers 13. The sprocket 11 is mounted on a shaft 14 journaled in a bracket 15 and carries a ratchet wheel 16. An arm 17 is loosely mounted on the shaft 14 and carries spring backed pawls 18 which cooperate with the teeth of the ratchet wheel 16. A pitman 19 is pivotally connected at its lower end to the arm 17 and at its upper end to a shoulder pin 20. The pin 20 extends through a slot in a crank arm 21 on a shaft 22 and is provided with a nut 23 so that its radial position in the slot may be adjusted as desired. In operation the shaft 22 is continuously rotated, thus effecting a swinging movement of the arm 17, the angle of the swing being determined by the position of the pin 20. A guard 24 is mounted on an arm 25, this arm having a hub which surrounds the shaft 14, but is not keyed thereto. The hub is collared and a screw 26 extends through a slot in the collar and into the bracket 15 so that the circumferential position of the guard may be adjusted as desired. In operation, the pawls are held out of engagement with the teeth of the ratchet wheels 16 during a portion of the stroke of the arm 17. By adjusting the position of the guard, the amount that the conveyor belt 6 is stepped forward on each stroke may be varied as desired.

The shaft 22 is provided with a cross pin 27 near its end. A drive shaft 28 in alignment with the shaft 22 is provided with a similar pin 29. A sleeve 30 lies over the shaft 28 and is slotted to receive both the pins 27 and 29. The sleeve is provided with a detent 31 which holds it in position on the shaft 28. The slot for the pin 29 is made of considerable depth so that the sleeve 30 may be moved along the shaft. When the sleeve is moved to the right, as viewed in the drawings, the driving connection with the pin 27 is broken, thus putting the stacker out of operation. The shaft 28 is connected through a universal joint 32 to a connecting shaft 32ª, which in turn is connected through a universal joint 33 to a stub shaft carrying a mitre gear 34. The mitre gear 34 meshes with a similar gear 35 on the central shaft 36 of the bottle blowing machine. The shaft 22 carries a spiral gear 37 meshing with a spiral gear 38 on a cross shaft 39. The cross shaft 39 carries a sprocket 40 and a sprocket chain 41 extends around the sprocket 40 over idlers 42 to a sprocket 43 on a shaft 44. The shaft 44 is mounted in brackets 45 and 46 and carries a mitre gear 47 meshing with a similar gear 48 on a vertical shaft 49 journaled in the bracket 46. The shaft 49 carries the cross arm 50 at its upper end and the sweeps 5 are pivoted to the ends of the arm 50 at 51. Springs 52 normally urge the brackets to swing around the pivot points 51 toward the shaft 49. The action of the spring is opposed by followers 53 bearing against a cam 54. The cam 54 is provided with a hub 55 and is mounted on a shouldered projection 56 at the top of the bracket 46. It is held in adjusted position by a set screw 57.

The cam 54 is provided with a portion 58 extending around substantially half the periphery of the cam and arranged to hold the sweeps 5 in their most extended position. In this position the sweeps engage bottles on the table 4 or bearing against the stop 3 and carry them across the table 4 onto the conveyor 6. At the moment that a sweep has carried the bottle to its proper position on the cross conveyor 6 the follower roller 53 encounters an end portion 59 on the cam which permits the spring 52 to pull the sweep rearwardly and thus clear the bottle. The sweep remains in its retracted position until upon further rotation of the arm 50 it is again moved to its extended position.

The positioning of the ware on the cross conveyor 6 may be nicely adjusted by shifting the position of the cam 54. This adjustment may be readily effected by loosening the set screw 57, turning the cam to the desired position and again tightening the set screw.

The sweeps 5 are constantly rotated, but are so timed that they deposit bottles on the cross conveyor 6 between steps of movement of the cross conveyor.

The pusher 7 is provided on its working face with spaced recesses 60. These recesses are spaced apart a distance corresponding substantially to the amount of movement of the conveyor 6 on each step thereof. In the illustrated form of the invention the pusher is provided with eight recesses and is so driven that it makes one cycle of movement for every eight steps of the cross conveyor 6. The recesses 60 properly space the bottles apart and insure that they will not be in contact in the leer.

If it is desired to use the stacker on bottles of another size, a different pushbar is substituted for the one having eight recesses. No provision is made for changing the position of the sweeps relative to the pusher as it is found that the bottles will be positioned in front of the recesses with sufficient accuracy to insure of their proper separation upon actuation of the pusher.

The pusher bar 7 is carried at the bottom ends of vertically extending rods 61. These rods pass through guides 62. The guides 62 are carried on a carriage frame 63 having wheels 64 running on track bars 65. The track bars are supported at one end on brackets 66 secured to the leer structure and at the other end on a frame member 67 which is supported from the floor by posts 68.

The carriage frame 63 also supports a fluid cylinder 69 having a piston 70 therein. A piston rod 71 is connected to a cross bar 72. The lift rods 61 are connected at their outer ends to the cross bar 72 so that when the piston 70 is moved to its upper position the pusher 7 is raised, and when the piston is moved to its lowered position the pusher 7 is also lowered. This movement, as hereinafter described, is effected in timed relation with the movement of the carriage.

The carriage frame 63 has mounted thereon a bracket 73 in which a pitman 74 is pivoted. The remote end of the pitman 74 is pivotally connected to a link 75 at one end thereof. The opposite end of the link 75 carries a follower roller 76 and intermediate its ends the link 75 is pivotally connected to a crank arm 77. The crank arm 77 is keyed to a shaft 78. This shaft is connected through spur gears 79 to a shaft 80 which in turn is connected through bevel gears 81 to the shaft 22. The shaft 78 is journaled in bearings 82 and a cam 83 is fixed to one of these bearings. The shaft 78 rotates in a counter-clockwise direction as viewed in Figure 3. Starting from the position shown in Figure 3, it will be seen that as the crank rotates the link 75 will be urged toward the left, thus causing the follower 76 to bear against the cam 83, and causing the carriage 63 to move to the left. As the movement progresses, the follower 76 comes into engagement with a high point 84 on the cam 83. This causes a rotation of the pivot point $p_1$ around the pivot point $p_2$ so that the normal crank motion is modified, the forward movement of the carriage being accelerated. The setting of the cam 83 is such that the increased velocity of the carriage is obtained during the period when the pusher 7 is moving over the cross conveyor 6. This does away with the necessity of employing stops for ware on the cross conveyor 6, as the ware is moved off the cross conveyor before a succeeding article is stepped forward to a position where it might interfere with the operation of the pusher.

After the follower 76 has moved over the high point 84 of the cam, it encounters a depression 85 and as the follower travels over this depressed portion of the cam, the normal crank motion is again modified so as to cause the carriage 63 to move at a materially decreased velocity. The depression 85 is so located that the low velocity of the carriage is obtained at the time that the ware is being moved off the dead plates 9 onto the leer belt 8. This minimizes the danger of ware tipping over in the leer.

A spring 86 connects the crank arm 77 with the link 75 and tends to hold the follower 76 against the cam 83. It is found in operation, however, that this spring need be only very light, or may be dispensed with entirely, as the relative resistance to movement of the several parts is such that the follower 76 always bears against the cam.

The pitman 74 is provided with an extension in the form of a finger 87 which is effective for controlling the vertical movement of the pusher 7. The finger engages a slot in the plunger 88 of a valve formed in the side wall of the cylinder 69. Fluid under pressure, such as air, is supplied through a flexible conduit 89, this conduit terminating at 90. An exhaust port 91 is provided a short distance below the inlet 90. The bottom of the cylinder 69 is connected through a conduit 92 to ports 93 and 94 lying respectively alongside the ports 90 and 91. The plunger 88 is grooved at 95 so that in its bottom position free communication is established between the bottom of the cylinder and the atmosphere through the conduit 92, the port 94 and the port 91. When the valve plunger is in its top position free communication is established between the fluid conduit 89 and the bottom of the cylinder through the ports 90 and 93 and the conduit 92.

The carriage 63 makes its forward or bottle feeding stroke during the movement of the crank 77 through the 180° above a horizontal center line through the shaft 78. During most of this movement the finger 87 is in a low position and the exhaust port 91 is held open. The pusher 7 is therefore maintained by its own weight and the weight of the exhausted parts in the position shown in the drawings. The downward movement of the rods 61 in their guides being limited by the connecting members 61a through which the rods are connected to the cross bar 72. When the carriage 63 has reached the left hand end of its stroke, as viewed in the drawings, the crank 77 is in an approximately horizontal position and lying at the left of its shaft 78, as viewed in the drawings. During a few degrees of rotation of the crank adjacent this point the finger 87 is moved upwardly an amount sufficient to close off the exhaust port 91 and to establish communication between the ports 90 and 93, thus allowing air to enter the bottom of the cylinder and raise the pusher 7. The pusher is therefore immediately elevated to such position that it clears the ware on the cross conveyor 6 on the return stroke.

The communication between the ports 90 and 93 is maintained during the return travel of the carriage 63, and the pusher does not drop to its bottom position until the crank reaches an approximately horizontal position at the right of its shaft 78, at which time the valve is again actuated in an amount sufficient to cut off the supply of air and to open the exhaust port. It will be understood, of course, that a certain amount of movement of the valve occurs substantially throughout the operation, but the critical movements take place at substantially the positions above described.

It will be noted from Figure 3 that the mechanism for moving the carriage is all mounted on the frame or table 67 and is therefore spaced a considerable distance above the conveyor 6. The conveyor 2 is at substantially the same level as the conveyor 6, as indicated in chain lines in Figure 3. This permits of placing the conveyor 2 at almost any angle to the cross conveyor. The posts 68 can be moved to different positions, as desired, so that if necessary the conveyor 2 may run over the table 67 without interference. It will be noted from Figure 2 that the table 67 is made symmetrical so that the driving mechanism can be placed on either side, as desired. This is of advantage as the driving mechanism may be mounted on whichever side is most convenient, taking into account the connection of the drive mechanism with the bottle blowing machine.

While we have illustrated and described the present preferred form of our invention, it will be understood that it is not thus limited, but may be otherwise embodied within the scope of the following claims:—

We claim:—

1. A leer stacker comprising a pusher, a crank for actuating the same, a link pivoted on the crank, a pitman connecting the link and the pusher, and a cam engaging the link and effective for modifying the action of the pusher.

2. A leer stacker comprising a pusher, a crank for actuating the same, a link pivoted on the crank, a pitman connecting the link and the pusher, and a stationary cam engaging the link and effective for modifying the action of the pusher.

3. A leer stacker comprising a carriage, a pusher mounted on the carriage and movable relative thereto, a lever pivoted to the carriage for effecting movement thereof, means for causing movement of the pusher relative to the carriage, and control means actuated by the lever for controlling the last mentioned means.

4. A leer stacker comprising a carriage, a pusher movable relative to the carriage, a fluid cylinder for effecting such relative movement, a lever for moving the carriage, and valve means controlled by the lever for controlling the operation of the fluid cylinder.

In testimony whereof we have hereunto set our hand.

CLYDE NAGLE.
RAYMOND W. NIVER.